(12) United States Patent
Schneider et al.

(10) Patent No.: US 10,183,469 B2
(45) Date of Patent: Jan. 22, 2019

(54) HEAT SHIELD AND SYSTEM WITH HEAT SHIELD OF THIS TYPE

(71) Applicant: REINZ-Dichtungs-GmbH, Neu-Ulm (DE)

(72) Inventors: Juergen Schneider, Merklingen (DE); Franz Schweiggart, Pfaffenhofen (DE); Axel Ritzal, Neu-Ulm (DE)

(73) Assignee: Reinz-Dichtungs GmbH, Neu-Ulm (DE)

(*) Notice: Subject to any disclaimer, the term of this patent is extended or adjusted under 35 U.S.C. 154(b) by 0 days.

(21) Appl. No.: 14/970,819

(22) Filed: Dec. 16, 2015

(65) Prior Publication Data

US 2017/0157896 A1 Jun. 8, 2017

(30) Foreign Application Priority Data

Feb. 27, 2015 (DE) .................. 20 2015 100 963 U (51) Int. Cl.
*B32B 15/00* (2006.01)
*B32B 15/14* (2006.01)
(Continued)

(52) U.S. Cl.
CPC .............. *B32B 15/14* (2013.01); *B32B 5/024* (2013.01); *B60R 13/0876* (2013.01); *F02B 77/11* (2013.01); *F16L 59/147* (2013.01); *F16L 59/22* (2013.01); *B32B 2250/02* (2013.01); *B32B 2262/101* (2013.01); *B32B 2262/108* (2013.01); *B32B 2307/102* (2013.01); *B32B 2307/304* (2013.01); *B32B 2571/00* (2013.01); *B32B 2605/08* (2013.01)

(58) Field of Classification Search
CPC ..... B32B 15/14; B32B 5/024; B32B 2250/02; B32B 2262/101; B32B 2262/108; B32B 2307/102; B32B 2307/304; B32B 2571/00; B32B 2605/08; F02B 77/11
See application file for complete search history.

(56) References Cited

U.S. PATENT DOCUMENTS

| 4,378,046 A | 3/1983 | Klinger |
| 5,555,932 A | 9/1996 | Dudley |
(Continued)

FOREIGN PATENT DOCUMENTS

| DE | 29621055 U1 | 2/1997 |
| DE | 10114496 A1 | 9/2002 |
(Continued)

OTHER PUBLICATIONS

Faserverbundwerkstoffe, Technical data: Hollow glass fibres (H-glass), Jun. 2010 (Year: 2010).*

(Continued)

*Primary Examiner* — Cephia D Toomer
(74) *Attorney, Agent, or Firm* — Marshall & Melhorn, LLC (57) ABSTRACT

The invention relates to a heat shield for the shielding of hot areas of components, e.g. of internal combustion engines. The heat shield has an insulating layer (3) and a metallic sheet layer (2) that are located next to each other. The insulation contains or consists of hollow fibers (10) as insulating material. The hollow fibers (10), at least in sections or over their entire length, have a tubular, hollow, unfilled cross section.

18 Claims, 5 Drawing Sheets

(51) Int. Cl.
*F02B 77/11* (2006.01)
*F16L 59/22* (2006.01)
*F16L 59/147* (2006.01)
*B60R 13/08* (2006.01)
*B32B 5/02* (2006.01)

(56) References Cited

U.S. PATENT DOCUMENTS

| | | |
|---|---|---|
| 2006/0196568 A1 | 9/2006 | Leeser et al. |
| 2009/0038881 A1 | 2/2009 | Fukuhara et al. |
| 2010/0176573 A1* | 7/2010 | Melton .................. B62J 37/00 280/304.3 |
| 2010/0330311 A1 | 12/2010 | Lobovsky et al. |
| 2011/0284189 A1 | 11/2011 | Sinha et al. |
| 2012/0180753 A1 | 7/2012 | Fonville et al. |

FOREIGN PATENT DOCUMENTS

| | | |
|---|---|---|
| DE | 10150259 A1 | 4/2003 |
| DE | 202008005857 U1 | 9/2009 |
| DE | 102010005164 A1 | 7/2011 |
| DE | 102012000310 A1 | 7/2012 |
| EP | 1671847 A1 | 6/2006 |
| WO | 2011146025 A1 | 11/2011 |

OTHER PUBLICATIONS

The International Bureau of WIPO, International Preliminary Report of Patentability, dated May 19, 2015, Geneva, Switzerland.

* cited by examiner

HEAT SHIELD AND SYSTEM WITH HEAT SHIELD OF THIS TYPE

BACKGROUND OF THE INVENTION

This invention relates to a heat shield, in particular of the type used to shield hot areas of components, e.g. of an internal combustion engine, and to a system with a heat shield of this type.

Heat shields of this type often have a housing that is composed of two metallic sheet layers. These metallic sheet layers are connected with each other at least in some areas on their edges, wherein as an insulating layer an additional layer, namely an intermediate later, is frequently located between the layers of sheet metal. This intermediate layer contains or consists of thermal and/or acoustical insulating material.

The prior art also includes heat shields in which one or more metallic sheet layers are located on only one side of an insulating layer. For assembly, the thermal and/or acoustical insulating layer is then laid directly on the component to be shielded. For this purpose, however, it is necessary to use sufficiently stable materials for the materials of the insulating layer.

Insulating materials used for the insulating layer are conventionally particles, for example, such as graphite, mica, expanded graphite and/or fibers such as glass fibers or silicate fibers. Fibers generally have a length that is more than three times their diameter. Both the particles as well as the fibers all have a filled cross section over their entire surface.

BRIEF SUMMARY OF THE INVENTION

One disadvantage of all these heat shields is that they are heavy and offer only limited insulating power. Relatively thick insulating layers are therefore conventionally used to achieve sufficient insulating power. However, that also increases the space requirement for the heat shield.

The object of this invention is therefore to make available a heat shield that has improved insulation and in which a specified insulating power can be achieved with a reduced use of material. An additional object of the invention is to make available a system consisting of a component to be shielded and a heat shield of the type described above.

This object is accomplished by the heat shield described in the claims.

This invention now makes available a heat shield for the shielding and insulation of hot areas of components. Components of this type include, for example, an internal combustion engine, including its exhaust components such as the exhaust manifold, the exhaust gas treatment unit and similar components, and/or heat exchangers, e.g. to heat motor oil or transmission oil, for auxiliary interior heating and/or for battery conditioning.

The heat shield according to the invention has an insulating layer that contains or consists of a thermal and/or acoustical insulating material. On one side of the insulating layer is a metallic sheet layer. Of course, a plurality of sheet metal layers or coatings can also be located on this side of the insulating layer. This sheet metal layer, in the assembled state, forms the outside of the heat shield. If one or more sheet metal layers are located only on one side of the insulating layer, the insulation can be located immediately next to the component to be shielded. In that case, an additional sheet metal layer on the second side of the insulating layer is not necessary.

In this application, it should be noted that the term "layer" means a layer that extends over at least 50% of the respective surface of the heat shield, preferably over at least 70% and particularly preferably over at least 85% of the respective surface area of the heat shield. Flanges that merely grip the insulating layer from one side do not represent their own layer on the other side of the insulating layer. Their purpose is only to hold the insulating layer in position on the one-sided sheet metal layer.

According to the invention, as the insulating material, hollow fibers are used at least partly, predominantly or even exclusively that have a tubular hollow, unfilled cross section at least in segments or over their entire length. The use of hollow fibers of this type has several decisive advantages compared to the prior art. As a result of the hollow space in the fibers, the insulating power, both in terms of thermal insulation as well as acoustic insulation, is better with an insulating layer of identical thickness than the insulating power of conventional materials. On the other hand, with similar insulating properties, this makes it possible to reduce the amount of material and the thickness of the insulating layer and thus to reduce the space required for the heat shield according to the invention. As a result of the hollow spaces in the fibers, the weight of the component is also reduced. Overall, when the hollow fibers according to the invention are used, the coefficient of thermal conduction of the insulating layer can be reduced from 0.4 W/mK for materials of the prior art to 0.2 W/mK, for example.

Of course, it is not necessary, although it is advantageous, if the predominant portion or all of the hollow fibers have a tubular, hollow, unfilled cross-section over their entire length. However, it is also sufficient if they have a hollow cross-section over only ≥75% of their length, preferably over ≥90% of their length. Interruptions of the hollow form can in particular result from shrunken cavities that are formed during the manufacture of the glass fibers. To compensate for the different rates of thermal expansion of glass material and air in the hollow space, it is preferable if the exposed ends of the hollow fibers are open.

Hollow fibers, the outside diameter AD of which is between 5 μm and 30 μm (each inclusive or exclusive of the limit values) have been found to be particularly advantageous. More advantageously, at least a portion of the hollow fibers have, at least in sections, an outside diameter AD with $10~\mu m \leq AD \leq 15~\mu m$. With regard to the inside diameter, it is advantageous if the hollow fibers have an inside diameter ID that is between 0.2 times the outside diameter and 0.9 times the outside diameter, in particular between 1 μm and 10 μm (each inclusive or exclusive of the limit values). At least a portion of the hollow fibers have, at least in sections, an inside diameter ID with $0.3~AD \leq ID \leq 0.7~AD$. At least a portion of the hollow fibers have, at least in sections, an inside diameter ID with $5~\mu m \leq ID \leq 6~\mu m$. The metallic sheet metal layer has, over at least some of its area, a sheet metal thickness BS with $0.15~mm \leq BS \leq 0.25~mm$.

The hollow fibers in the insulating layer need not be all identical, but it is sufficient if they are similar or identical in terms of one or more properties. The insulating layer, in the longitudinal plane and/or at a right angle to the longitudinal plane, can also have two or more segments in which the hollow fibers are different in terms of a property. This option makes it possible to have particularly effective insulation in hot spots, i.e. areas in which a particularly large amount of heat is generated, for example by an accumulation of hollow fibers with a particularly large hollow proportion, compared to other areas that are subjected to lower thermal loads.

It is also possible to arrange fibers with different properties in layers, i.e., for example, to apply a layer of hollow fibers directly to the sheet metal layer, and to cover that layer with a layer of solid fibers.

However, it is particularly advantageous if at least one property is the same, for example the material, the length and/or the outside diameter of the hollow fibers, the volumetric proportion of the hollow space in the hollow fibers to the volume of the overall hollow fibers and/or the length and/or the diameter of the hollow cross section.

For this invention it is also harmless if the insulating layer contains sections that contain or consist of solid fibers without hollow spaces or if the insulating layer, over a portion of its surface or over its entire surface, contains a certain proportion of solid fibers without hollow spaces in addition to hollow fibers.

This invention can be implemented in particular by the use of glass fibers and/or silicate fibers. For example, the fibers can be produced using or from alkali-free aluminum borosilicate glass. The types of glass cited here, e.g. alkali-free aluminum borosilicate glass, can have an outside diameter of 10 to 12 μm with an inside capillary tunnel diameter between 5 and 6 μm. Glass fibers of this type have a higher bending strength than solid fibers, in spite of their approximately 40% lower density. Consequently, the fibers are more elastic and have a higher compression strength as well as higher specific strength, improved thermal and/or acoustic insulating properties and a lower thermal conductivity. The density can be, for example, 1.4 g/cm$^3$ and the thermal conductivity 0.21 W/mK. If they are suitably connected to one another, the fiber material that is used for the insulating layer, which at least has a defined contour, is also self-supporting with many types of connections. For a particularly flexible configuration of the insulating layer, however, it is preferable if it has a filled material at least in sections, which is held in place, for example, by a layer of fibers connected with one another at the points in question. For this purpose, the self-supporting sections of the insulating layer, in particular sections of the insulating layer solidified with binder, can be in the form of shaped parts that have depressions or protuberances to hold the filled material. The shaping of the sheet metal layer with depressions, for example, can facilitate the realization of embodiments shaped in this manner.

To improve the stability of the insulating layer, the fibers can be needled, sewn, crocheted, woven or in the form of fleece, for example. Alternatively, they can be at least partly, predominantly or completely connected with one another by means of a binder, to give the insulating layer inherent stabilization.

The metallic sheet metal layer located on the one side of the insulating layer can have a sheet metal thickness, at least in areas over its entire area, between 0.075 mm and 0.8 mm (both including and excluding limit values). The sheet metal layer can therefore also be metal films, in particular structured, e.g. burled or micro-perforated metal films.

Optionally, the insulating layer can also contain phase change materials. For this purpose, for example, phase change materials with phase change temperatures between 70 and 300° C., preferably between 80° C. and 200° C., can be used. Phase change materials of this type include, for example, paraffin, salt hydrates or eutectic salt hydrate mixtures, salts or eutectic salt mixtures or similar materials. As a result of the use of phase change materials, the areas of a component next to the heat shield, in particular the areas of a component surrounded by the heat shield or a component completely surrounded by the heat shield, for example, can be heated when an engine is started even more quickly than is possible with the use of the hollow fibers according to the invention. As the result of a rapid heating, for example of an internal combustion engine as the component, harmful emissions in the startup phase of the internal combustion engine are reduced.

Several examples of heat shields according to the invention and systems according to the invention are described below. In all the accompanying figures, identical or similar reference numbers are used for identical or similar elements, so that in some cases an explanation is not repeated.

The following examples illustrate heat shields and systems in which a plurality of optional features of this invention are represented together with mandatory features of this invention in a single exemplary embodiment. The optional features, however, can also be implemented individually, together with the mandatory features of this invention, regardless of how they are portrayed in combination with other optional features in the following description.

DETAILED DESCRIPTION OF THE INVENTION

Figure 1:
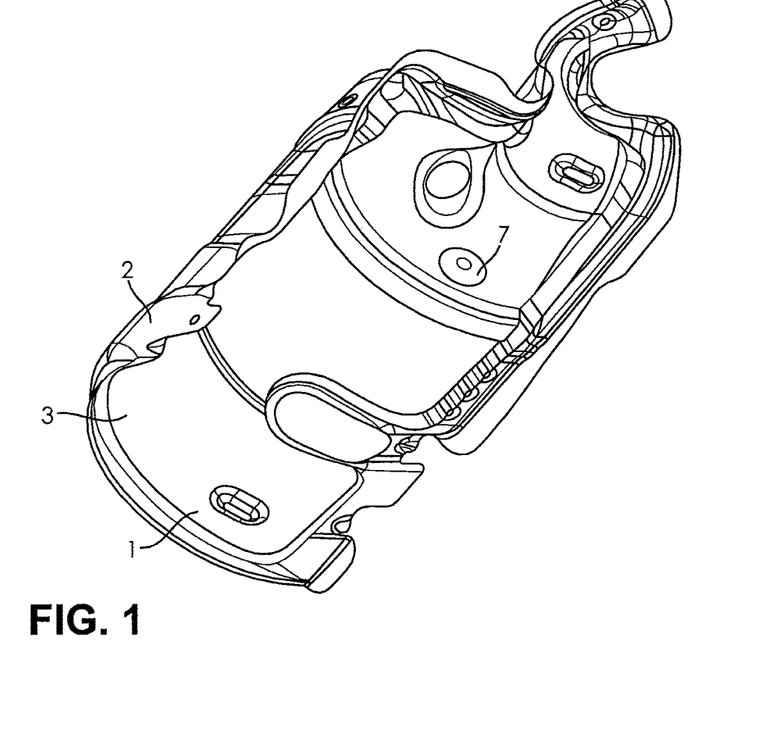
FIG. 1 illustrates a heat shield according to the invention.

FIG. 1 is a plan view of the inside of a heat shield 1 with a sheet metal layer 2 and an insulating layer 3. The view in FIG. 1 is a plan view of the inside of the curved heat shield 1 on the exposed surface of the insulating layer 3. Openings 7 extend through the sheet metal layer 2 that covers the insulating layer 3 on the side away from the viewer and through the insulating layer 3, which are in the form of screw holes, for example.

Figure 2:
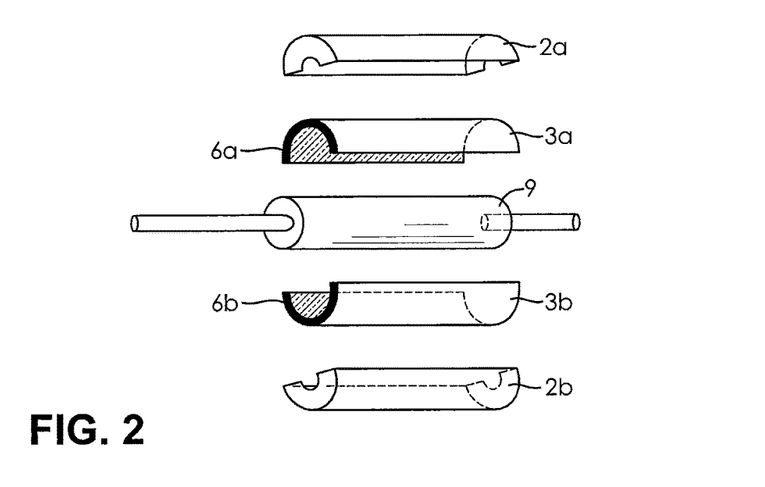
FIG. 2 is an exploded view of a system claimed by the invention.

FIG. 2 illustrates a system claimed by the invention with a heat shield claimed by the invention as illustrated in FIG. 1, in a schematic view in a combination view with an exhaust gas treatment system as the component 9, the hot areas of which are to be shielded. In this exploded view, the component 9 is surrounded and covered by two half-shells 3a and 3b of the insulating material as an insulating layer. Located above this insulating material are two half shells 2a and 2b of a sheet metal layer, that extend on their sides beyond the edges 6a and 6b or the facing edges of the insulating layers 3a and 3b. Thus the component 9 is surrounded by the insulating layer 3a/3b and is simultaneously completely enclosed by the sheet metal layers 2a and 2b.

Figure 3:
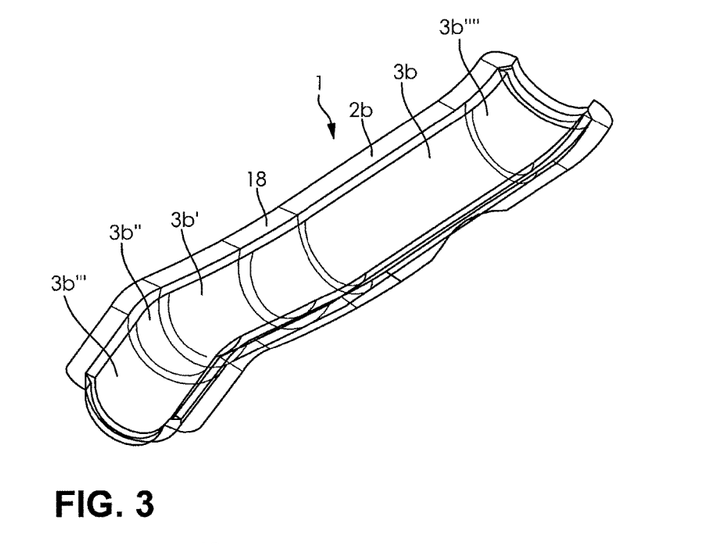
FIG. 3 illustrates a heat shield according to the invention.

FIG. 3 shows the sheet metal layer half-shell 2b and the half-shell 3b of the insulating material of a heat shield 1 according to the invention as illustrated in FIG. 2. In addition, the peripheral areas 18 that protrude outward are visible only in the sheet metal layer half-shell 2b, by means of which the half shells illustrated in FIG. 2 are fastened to each other, e.g. by means of flanges or welding. The half-shell 3b has various segments 3b', 3b", 3b'", 3b"" etc. that have different orientations relative to one another. Between the segments 3b', 3b", 3b'", 3b"" etc. there are kinks or bends 16. With loose or relatively loosely solidified hollow fiber material, the insulating layer 3 can be applied relatively easily to these kinks or bends. Likewise, it is possible to manufacture the half-shell 3 in the form of a shaped part, in particular if it is a hollow fiber material solidified by binder. Alternatively, however, it is also possible to cut out excess hollow fiber material or to use the hollow fiber mat material in sections. If the hollow fiber material is composed in sections of shaped parts, it is easily possible to combine different hollow fiber materials with one another. For example, the terminal segments 3b'" and 3b"" can consist of hollow fiber/solid fiber mixtures, while all the segments between them have no solid fibers. It is likewise possible for the segments 3b' and 3b", for example, to have hollow fibers of different sizes.

Figure 4:
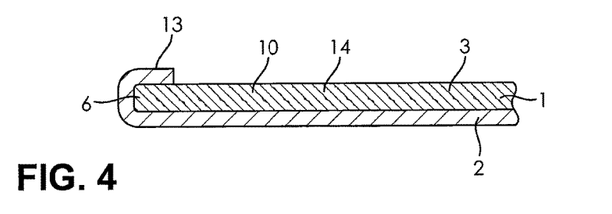
FIG. 4 is a detail in cross-section of a heat shield according to the invention.

FIG. 4 shows a detail of a heat shield according to the invention in the peripheral area 6 of the insulating layer 3 in cross-section. The insulating layer 3 has fibers 10 that are stabilized by means of a binder 14. Only on one side of the insulating layer 3 is a sheet metal layer 2 provided that extends around the edge 6 of the insulating layer 3 with a flange.

Figure 5:
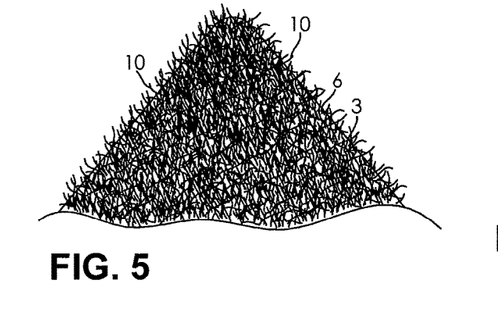
FIG. 5 is a plan view of an insulating layer claimed by the invention.

FIG. 5 shows a detail of a plan view of an insulating layer 3 and its edge 6. The fibers 10 that are fastened to one another in the manner of a fleece in the central area of the insulating layer 3 are clearly visible and on the edge 6, individual fibers project beyond the edge 6. The dark areas thereby represent the areas of the fleece that are needled with each other.

Figure 6:
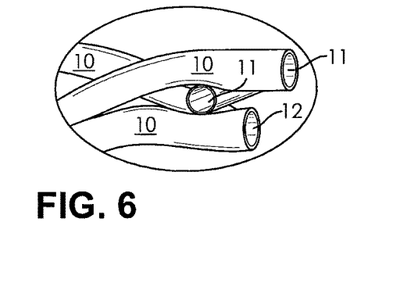
FIGS. 6 and 7 are details on a larger scale in the form of schematic drawings of an insulating material claimed by the invention.

FIG. 6 is an enlarged detail of a fleece layer according to the invention. This layer has hollow fibers 10 that have a tubular hollow cross-section with hollow spaces 11. In this example the fibers 10 are woven with one another into a fleece and are tubular and hollow over their entire length, with a ratio of 0.85 between the diameter of the hollow space and the diameter of the total fiber.

Figure 7:
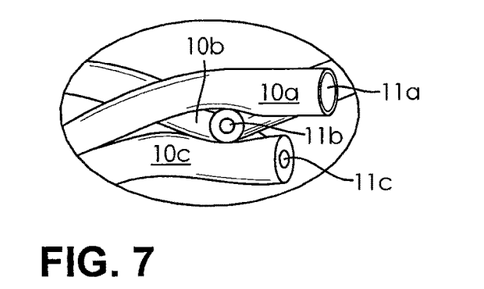

FIG. 7 shows an enlarged detail of another fleece material. In this fleece material, in contrast to the one illustrated in FIG. 4, the fibers are different. The ratio between the diameter of the hollow space and the outside diameter of the fiber in the three illustrated fibers 10a, 10b and 10c with the hollow spaces 11, 11b and 11c is different with different diameters and is 0.94 for fiber 10a, 0.55 for fiber 10b and 0.33 for fiber 10c.

Figure 8:
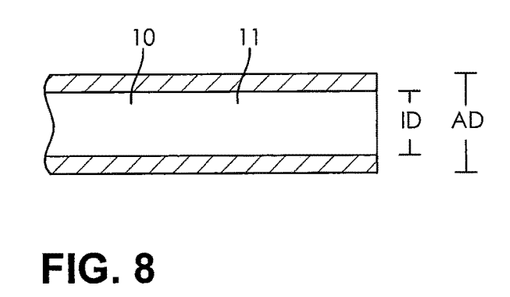
FIG. 8 is a detail in cross-section of a heat shield according to the invention comprising hollow fibers.

FIG. 8 shows a cross-section through a hollow fiber of the insulating material according to the invention. The hollow fiber 10 has a hollow interior 11. The inside diameter of the hollow space is marked ID, while the outside diameter of the hollow fiber 10 is marked AD. In this example, the ratio between the inside diameter ID and the outside diameter AD is 0.6.

Figure 9A:
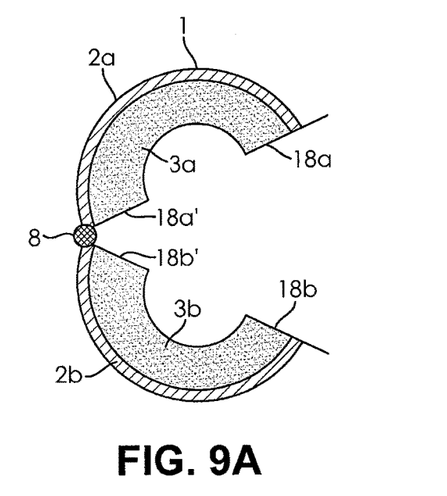
FIG. 9A is a cross-section of a heat shield according to the invention.
Figure 9B:
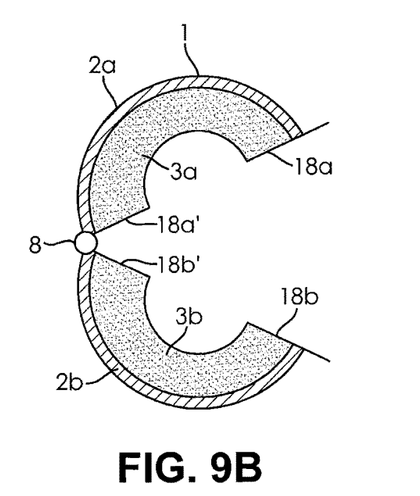
FIG. 9B is another cross-section of a heat shield according to the invention.

FIG. 9 shows, in the sub-figures A and B, two additional heat shields 1 claimed by the invention, each with an outer sheet metal layer that consists of two sub-layers 2a and 2b. These sub-layers are in contact with an insulating material that consists of two sub-layers 3a and 3b. The partial area consisting of sheet metal layer 2a and insulating material 3a has end surfaces 18a and 18a', while the partial area consisting of the sheet metal layer 2b and the insulating layer 3b has end surfaces 18b and 18b'.

The sheet metal layers 2a and 2b are rotationally connected to each other by means of a hinge so that they can be opened and closed relative to each other. In the closed position, the end surfaces 18a' and 18b' come to lie on each other and the end surfaces 18a and 18b on each other.

The heat shields 1 illustrated in the sub-figures A and B differ in that both insulating material half-shells 3a, 3b in FIG. 9A are fabricated from identical insulating material, while in FIG. 9B the half-shell 3b is made of a different insulating material than half-shell 3a. The hollow fibers from which the half-shell 3b is fabricated have a smaller inside diameter ID than those from which the half-shell 3b is fabricated. The outside diameter AD and the glass material, on the other hand, are essentially identical. Furthermore, the heat shields of the two sub-figures A and B differ in that the hinge 8 in FIG. 9A is filled with an insulating material, while in the heat shield illustrated in FIG. 9B the hinge 8 is unfilled.

Figure 10:
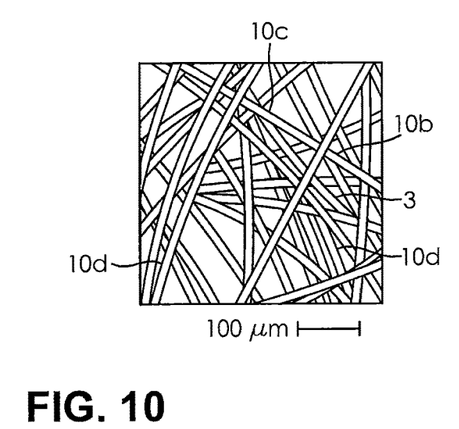
FIGS. 10 and 11 are views of insulating materials according to the invention.

FIG. 10 is a plan view of a fiber material that is used for an insulating layer 3 according to the invention. In the figure, for example, the hollow fibers illustrated in the detail are designated 10a, 10b, 10c and 10d, which differ in terms of their outside diameter, i.e. in terms of one property. However, they are all made of the same glass material. FIG. 10 also indicates the dimension of the glass hollow fibers with reference to the 100 μm scale.

Figure 11:
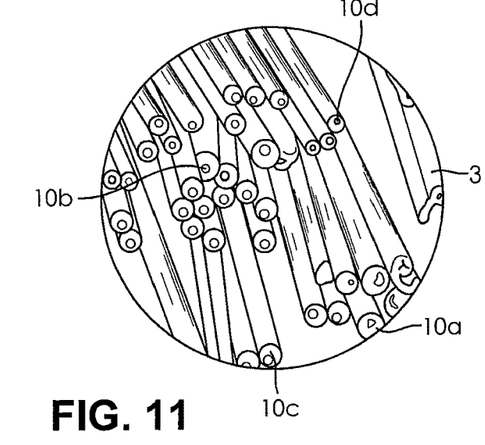

FIG. 11 shows a cross section through a detail of the insulating layer 3 which is illustrated in the plan view in FIG. 10. Clearly visible are cross sections through hollow fibers 10a, 10b, 10c and 10d, which have different outside diameters and different inside diameters of their hollow spaces.

Figure 12A:
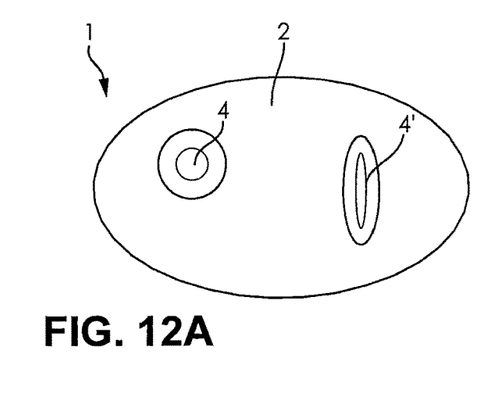
FIGS. 12A and 12B are views of heat shields according to the invention.
Figure 12B:
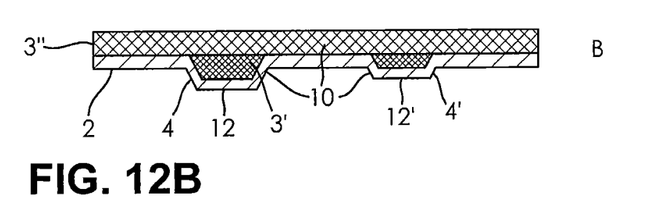

FIG. 12, in sub-figure A, shows a highly schematic overhead view of the sheet metal layer 2 of a heat shield 1, which has two pot-shaped depressions 4, 4' pointing toward the viewer. The sectional drawing in sub-figure B clearly shows that these pot-shaped depressions 4, 4' are used to hold packed beds 12, 12' of loose hollow fibers 10, which are identified as 3' and form a part of the insulating layer 3. By means of these packed beds, a particularly thick insulating layer is achieved at the places in question, which is appropriate for isolating and shielding what are called hot spots, i.e. areas of especially high heat exposure. The hollow fibers 10 of the packed beds 12, 12' can be identical or different in terms of their dimensioning and/or chemical composition and/or density of the packed bed. Likewise, they can be identical or different with reference to their dimensioning and/or chemical composition to the hollow fibers 10 of the needled section 3" of the insulating layer 3 that covers the packed beds 12, 12' and thereby stays securely in the depressions 4, 4' even before installation. While it is preferable for the packed beds 12, 12' to use exclusively hollow fibers—that can optionally have pipes as a result of production conditions—the needled section 3" of the insulating layer 3 can also be a mixture of hollow fibers and solid fibers.

Figure 13:
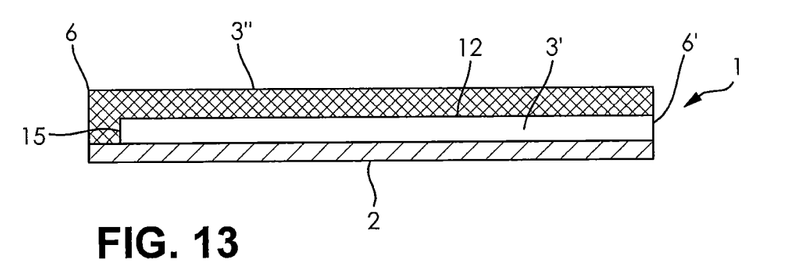
FIG. 13 is a view of a heat shield according to the invention.

Finally, FIG. 13 is a schematic sectional drawing that shows an additional potential configuration for the layer structure of a heat shield 1 with a sheet metal or metal film layer 2 and an insulating layer 3 which in this case consists in sections—in section 3"—of hollow fibers 10 that have a fixed contour and in this case are even self-supporting, namely solidified with binder, and has sections 3' that are formed by loose packed beds 12 of hollow fibers 10. In this case, the sections lie on top of one another essentially perpendicular to the boundary surface 5 between the metal film layer 2 and the insulating layer 3. The solidified section 3" of the insulating layer 3, together with the metal film layer 2, therefore forms a sort of housing for the packed bed 12. As in the previous example, the solidified hollow fibers 10 of the section 3" can be identical or different to the hollow fibers of section 3' in terms of their dimensioning and/or chemical composition. In turn, it is preferable if the fibers of section 3' consist exclusively of hollow fibers, while for the solidified section 3" both all hollow fibers as well as mixtures of hollow fibers and solid fibers can be used. By way of example, the two edges 6, 6" illustrate possible configurations for the outer edge of the insulating layer 3. While on the left edge 6, the solidified section 3" is configured so that it forms a lateral flange 15, by means of which the edge of the packed bed 12 is protected against a detachment of hollow fibers 10, on the right edge 6' both the packed fiber material of section 3' as well as the solidified section 3" of the insulation project on the right edge 6' as far as the illustrated edge of the metal film layer 2. The latter is related to reduced manufacturing cost and effort and can be easily used if the relative edge of the heat shield 1, as shown in FIGS. 2 and 9, is connected with another heat shield (section).

The invention claimed is:

1. A heat shield to shield hot areas of a component of an internal combustion engine, comprising:
 an insulating layer having a thermal and/or acoustical insulating material, and
 at least one metallic sheet layer that is located on one side of the insulating layer, wherein in the assembled state the at least one metallic sheet layer forms the outside of the heat shield,
 wherein the insulating material comprises hollow fibers that have a tubular, hollow, unfilled cross section at least in sections or over their entire length;
 wherein the insulating layer and the at least one metallic sheet layer are attached to the component so that the insulating layer and the component are in contact with one another.

2. The heat shield of claim 1, wherein the hollow fibers have a tubular, hollow, unfilled cross section over ≥90% of their length.

3. The heat shield of claim 1, wherein at least a portion of the hollow fibers have, at least in sections, an outside diameter AD with 10 μm≤AD≤15 μm.

4. The heat shield of claim 1, wherein at least a portion of the hollow fibers have, at least in sections, an inside diameter ID and an outside diameter AD with 0.3 AD≤ID≤0.7 AD.

5. The heat shield of claim 1, wherein at least a portion of the hollow fibers have, at least in sections, an inside diameter ID with 5 μm≤ID≤6 μm.

6. The heat shield of claim 1, wherein said at least one metallic sheet layer is located only on one of the surfaces of the insulating layer.

7. The heat shield of claim 1, wherein the hollow fibers that are contained in the insulating layer have at least one property or all their properties identical for the entire insulating layer.

8. The heat shield of claim 1, wherein the insulating layer, in the plane of the layer and/or at a right angle to the plane of the layer, has at least two or more sections, wherein the hollow fibers that are contained in one section have at least one property that is different from the hollow fibers that are contained in a second section.

9. The heat shield of claim 7, wherein the at least one identical property and/or the at least one other property is the length and/or the outside diameter of the hollow fibers, the volumetric proportion of the hollow space of a hollow fiber with reference to the volume of the overall hollow fiber and/or the length and/or the diameter of the hollow cross section.

10. The heat shield of claim 1, wherein the metallic sheet metal layer has, over at least some of its area, a sheet metal thickness BS with 0.15 mm≤BS≤0.25 mm.

11. The heat shield of claim 1, wherein, in sections, the insulating layer has solid fibers without hollow spaces, or over its entire surface, contains solid fibers without hollow spaces in addition to hollow fibers.

12. The heat shield of claim 1, wherein at least some of the hollow fibers are glass fibers and/or silicate fibers.

13. The heat shield of claim 12, wherein at least some of the hollow fibers are manufactured with the use of alkali-free aluminum-borosilicate glass.

14. The heat shield of claim 1, wherein the insulating layer, at least in sections, is needled, sewn, knitted, crocheted or a felt.

15. The heat shield of claim 1, wherein the insulating layer contains phase change material, the phase change temperature of which is between 70° C. and 300° C.

16. The heat shield of claim 1, wherein the phase change material comprises paraffin, salt hydrates or eutectic salt hydrate mixtures, salts or eutectic salt mixtures or similar substances.

17. A heat shield to shield hot areas of a component of an internal combustion engine, comprising:
 an insulating layer having a thermal and/or acoustical insulating material, and
 at least one metallic sheet layer that is located on one side of the insulating layer, wherein in the assembled state the at least one metallic sheet layer forms the outside of the heat shield,
 wherein the insulating material comprises hollow fibers that have a tubular, hollow, unfilled cross section at least in sections or over their entire length wherein at least some of the hollow fibers are connected to one another by a binder,
 wherein the hollow fibers connected to one another by the binder have a fixed contour.

18. A heat shield to shield hot areas of a component of an internal combustion engine, comprising:
 an insulating layer having a thermal and/or acoustical insulating material, and
 at least one metallic sheet layer that is located on one side of the insulating layer, wherein in the assembled state the at least one metallic sheet layer forms the outside of the heat shield,
 wherein the insulating material comprises hollow fibers that have a tubular, hollow, unfilled cross section at least in sections or over their entire length, wherein some of the hollow fibers comprise interruptions of the hollow form.

* * * * *